INVENTOR.
GEORGE V. YOUNG
BY Harry R. Lubcke
AGENT

Sept. 8, 1964 G. V. YOUNG 3,148,335

GATED DEMODULATOR APPARATUS

Filed May 24, 1961 2 Sheets-Sheet 2

INVENTOR.
GEORGE V. YOUNG

BY Harry R. Lubcke

AGENT 3,148,335
Patented Sept. 8, 1964

3,148,335

GATED DEMODULATOR APPARATUS

George V. Young, Reseda, Calif., assignor to Endevco Corporation, Pasadena, Calif., a corporation of California Filed May 24, 1961, Ser. No. 112,331
12 Claims. (Cl. 330—10)

My invention relates to apparatus for electrical amplification and particularly to such apparatus employing modulation, amplification and gated demodulation.

The electrical arts find an expanding need for precision amplification. While the "chopper" type of amplifier apparatus for amplifying direct currents is a known device, such apparatus has been subject to variation of zero reference and/or variation of gain as a function of time, as a function of changes in temperature or of changes in other ambient parameters. Meantime, the need for precision has increased because of the significance of accurate measurements in all kinds of instrumentation.

Concomitant with demands for accuracy and stability have come those of small size, light weight, exclusively static components, small power drain and small heat generation.

My investigations revealed that one aspect of spurious functioning in apparatus of this type accounted for the inability of the known art to achieve the new levels of performance sought. This was the presence of transients upon the "chopped" waveform, or of inequalities of symmetry of this waveform. When a mechanical vibrator type of chopper was employed this was displayed as the known "chopper bounce" and when a transistorized chopper was employed this was capacitance-caused transients at the rapid throws of the square wave modulating waveform, often taking the form of overshoots. Not only did these spurious effects create uncertainty of performance, but I found that they varied with temperature, with length of time of operation of the apparatus and/or with other ambient parameters.

I determined that more precise operation under changing operating conditions was possible when a gating or keying waveform was employed in the demodulating process. This I phase to pass only the center portion of the chopped and amplified signal waveform. Accordingly, the demodulator does not "see" the spurious effects at the ends of the waveform and so provides a constant and true output.

This has resulted in improved practical performance, of which a zero stability of better than 0.1% of full scale value for 1,000 hours of operation and a gain stability of 0.1% for 24 hours of operation were obtained in numerous practical embodiments of my apparatus. Such operation was obtained over a temperature range of from room temperature to 120° F.

An object of my invention is to provide apparatus for accomplishing electrical amplification according to precise parameters.

Another object is to demodulate amplified electrical energy in accordance with the true amplitude of such energy.

Another object is to gate a synchronous demodulator.

Another object is to provide precision amplifying apparatus having small size, light weight, exclusively static components, small power drain and small heat generation.

Other objects will become apparent upon reading the following detailed specification and upon examining the accompanying drawings, in which are set forth by way of illustration and example certain embodiments of my invention.

Figure 1:
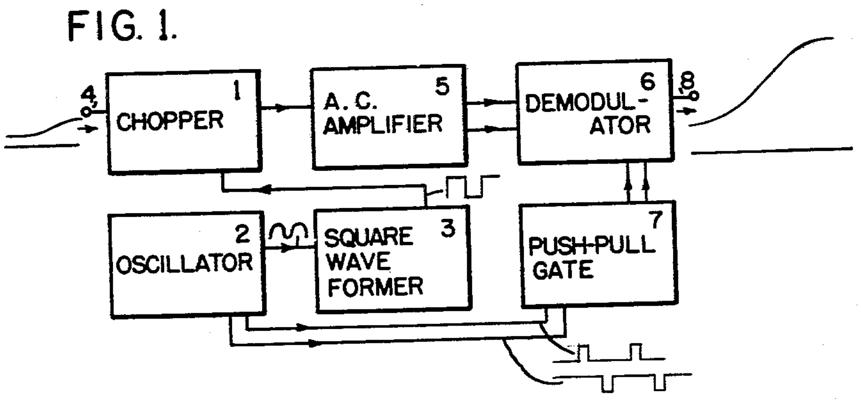
FIG. 1 is a block diagram of my apparatus.

In FIG. 1 numeral 1 indicates an electrical chopper device. These are known in the form of mechanically vibrating reeds. While such an embodiment may be used according to my invention I prefer a static transistorized chopper to be described later.

An electrical oscillator 2 provides driving energy for the chopper and also energy for accomplishing synchronous demodulation. In FIG. 1 the driving energy is first converted to a square waveform by square wave former 3, which may be a form of over-driven amplifier, before being applied to the transistorized chopper. Should a mechanical chopper be employed element 3 is not required, though it may be retained.

According to the known technique, the amplitude of direct current signal or of slowly varying signal is applied to the chopper at an input terminal 4 and an alternating current signal is thereby produced. It has the frequency of the output of oscillator 2 and the amplitude of the input signal. While a slowly varying input signal has been mentioned, a mechanical chopper embodiment of my apparatus is effective in amplifying input signals having a frequency of alternation from zero to the order of one hundred cycles per second, while a transistorized chopper embodiment of my apparatus is effective from zero to a few thousand cycles per second.

The thus modulated signal is amplified as may be desired by A.C. amplifier 5. A voltage gain of 40 to 60 db is a representative gain for this entity. This amplifier is conventional and may be transistorized. The amplified output is taken from amplifier 5 and impressed upon demodulator 6 in a two-terminal manner.

A push-pull output is taken from oscillator 2 and is impressed upon push-pull gate 7.

Figure 3:
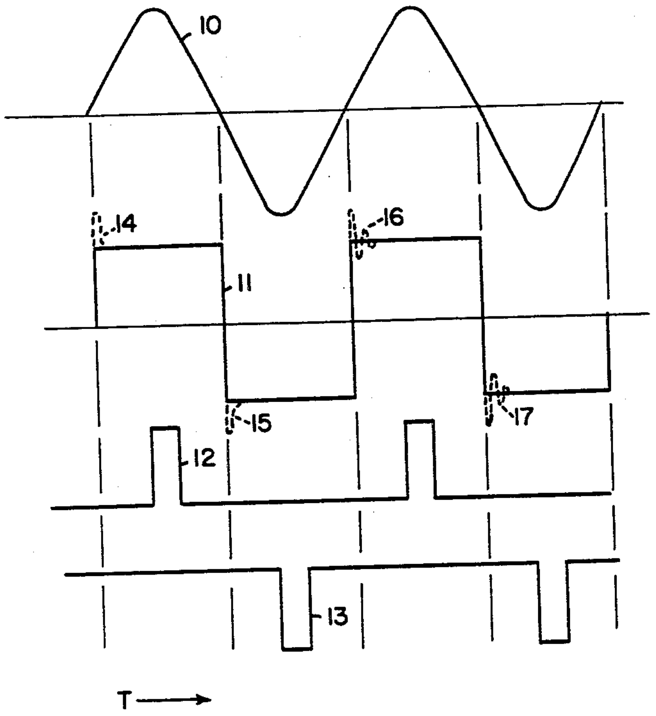
FIG. 3 is a graph of related waveforms having to do with the functioning of my apparatus.

In FIG. 3 the output of the oscillator is represented as sine wave 10. The output of square wave former 3 is likewise represented to the same time scale along the abscissa by square waveform 11. Similarly, one phase of the push-pull output from gate 7 is the waveform 12 and the other phase thereof is 13. Gate 7 forms these phases from the peaks of the sine wave 10.

Waveforms 12 and 13 are impressed upon demodulator 6 in conjunction with the amplified signal waveform from amplifier 5. The latter has substantially the shape of waveform 11 and an amplitude to match the incoming signal from terminal 4. The simultaneous occurrence of the signal waveform and of the gating or keying waveform is required to produce an output from demodulator 6. Thus, it is seen that only the central part of the signal waveform is passed through.

If, then, there are spurious transients at the beginning of each alternation of the amplified signal waveshape, as at 14 and 15, or at 16 and 17, as shown in dotted lines in waveform 11, these transients will not be effective in forming the demodulated output. Nor will change in the durations of the half-waves of the chopper-produced waveform be effective in altering the demodulated output.

My true output is taken from demodulator 6 at terminal

8. This output is normally filtered to remove the oscillator-induced alternations of frequency higher than any signal frequency variations.

Figure 2:
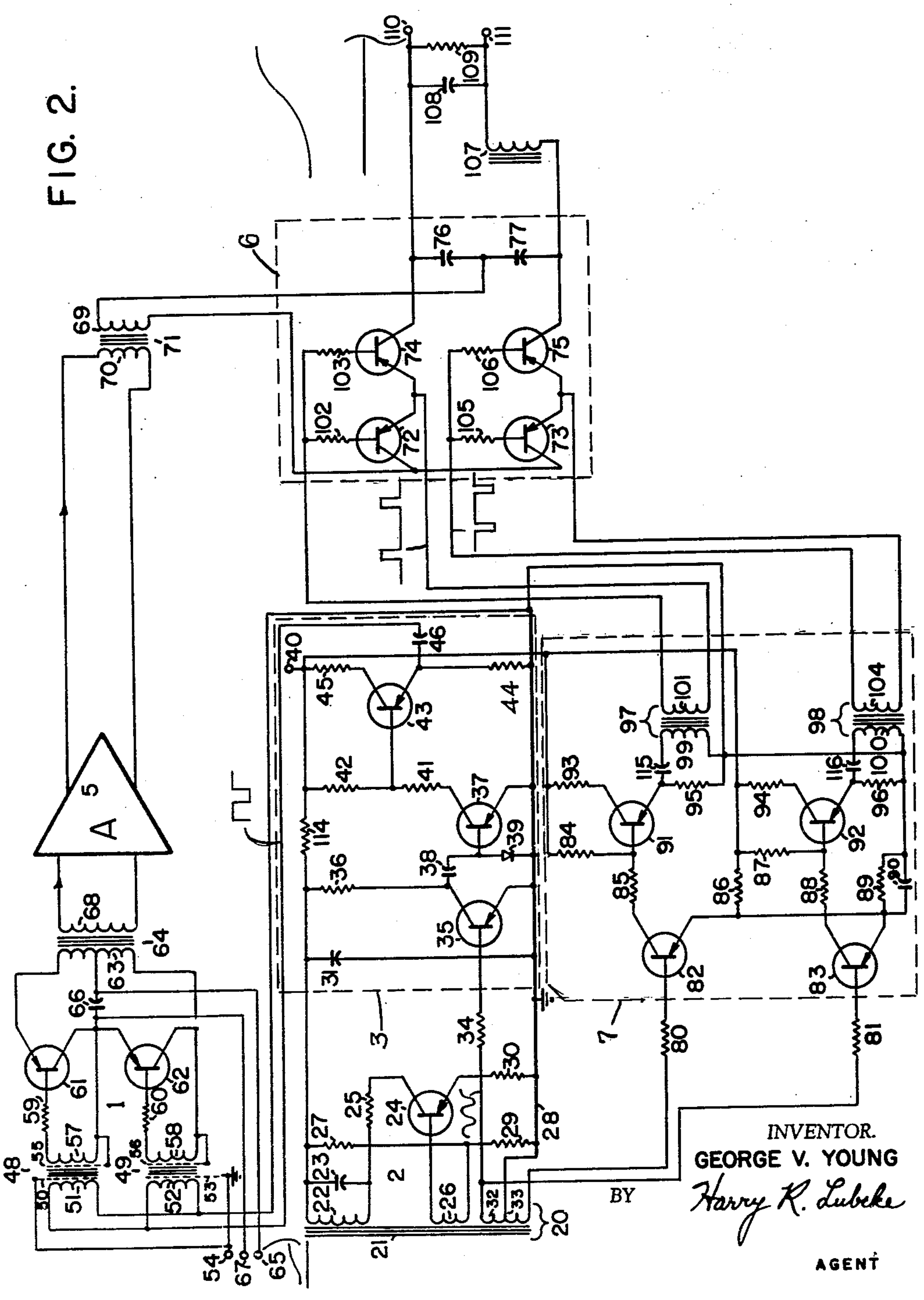
FIG. 2 is a schematic diagram of my apparatus.

We turn now to a consideration of the schematic circuit diagram of FIG. 2.

Inductor 20 forms an important part of the circuit of oscillator 2. The core 21 may be of ferrite and the physical size of the whole inductor may be approximately that of the diameter of a United States five cent piece. Winding 22 and capacitor 23 are connected in shunt relation to form the resonant circuit of the oscillator. While the frequency chosen for this oscillator may be any one over a wide range, in embodiments of my invention I prefer a frequency within the range of 50 cycles per second to 150 kilocycles per second. One terminal of this resonant circuit is connected to the collector electrode of transistor 24 through a resistor 25, having a resistance of a few thousand ohms. Transistor 24, in common with all of the transistors in a typical embodiment, may be of the PNP type.

A second winding 26 of inductor 20 is connected directly to the base electrode of transistor 24 and through resistor 27 of several thousand ohms resistance to one terminal of the resonant circuit. This is the terminal opposite that connected to the collector of the transistor. The second terminal of winding 26 is also connected to a signal ground at conductor 28 through resistor 29, which resistor has a resistance of only a few hundred ohms. Winding 26 may be regarded as the feedback winding of the oscillator.

Completing the oscillatory circuit itself, the emitter of transistor 24 is connected through resistor 30, having a few hundred ohms resistance, to the signal ground conductor 28 previously mentioned. A capacitor 31 of low reactance at the oscillating frequency connects from the junction of resonant capacitor 23 and resistor 27 to signal ground 28.

Winding 32 of inductor 20 has a center-tap 33 which connects directly to signal ground 28. This provides a push-pull output for the operation of push-pull gate 7. One side of this winding is also employed to provide an input to square wave former 3. This second output passes through resistor 34 of a thousand ohms resistance to the base electrode of transistor 35. Transistor 35 functions as an amplifier. The emitter thereof is connected to signal ground 28 and the collector through a resistor 36 to a source of regulated electrical energy having a constant value of the order of twenty volts. Resistor 36 has a resistance of a few thousand ohms.

The output oscillator 2 is the sine waveshape 10 of FIG. 3. The amplitude thereof is considerably in excess of what amplifier 35 can amplify without distortion and so the waveshape is clipped top and bottom to approximately the square waveshape 11 of FIG. 3. In order that this process be refined for greater rectangularity of the waveform transistor 37 is provided in cascade with transistor 35. The square wave is conveyed from the first to the second transistor through capacitor 38, which capacitor has a capacitance of a few microfarads. Diode 39 completes the path from capacitor 38 to signal ground to protect transistor 37 from reverse signal inputs sufficiently high to damage it. The diode passes any signals having an amplitude much in excess of one volt.

The base and emitter electrodes of transistor 37 are shunted across diode 39, the former also being connected to capacitor 38 and the latter to signal ground 28. The collector electrode of transistor 37 is connected to the minus twenty volt terminal 40 through two seriesed resistors 41 and 42, the former having a resistance of the order of a thousand ohms and the latter a resistance of approximately three times this value.

The junction between resistors 41 and 42 is connected to the base of transistor 43, which acts as a current amplifier for the square wave output. The emitter of transistor 43 is connected to signal ground through resistor 44, which has a resistance of fifteen hundred ohms. The collector of transistor 43 connects to voltage source 40 through resistor 45, which has a resistance of the order of one hundred ohms.

The square wave signal output is taken from the emitter of transistor 43 via capacitor 46, which has a capacitance of a few microfarads. Modulator, or chopper, 1 is fed through two transformers 48 and 49, in parallel. The second terminal of each of these transformer primaries 51 and 52 is connected to signal ground.

Transformers 48 and 49 are identical, having approximately a four to one step down ratio in voltage. Each primary 51 and 52 is isolated electrostatically from the cores thereof by electrostatic shields 50 and 53, which shields are connected to the input signal ground 54. A second pair of electrostatic shields 55, 56 are individually connected to the "ground" side of secondaries 57, 58 of transformers 48 and 49, respectively.

The opposite sides of secondaries 57, 58 are connected through resistors 59, 60, each having a resistance of a thousand ohms, to the bases of chopper transistors 61 and 62, respectively. The collector of transistor 61 is connected to the ground side of secondary 57 and the emitter of transistor 62 is also there connected. The collector of transistor 62 is connected to the ground side of secondary 58 and also to one extremity of center-tapped primary 63 of chopper output transformer 64. The emitter of transistor 61 is exclusively connected to the opposite extremity of primary 63. The center-tap of this primary is connected to one input signal terminal 65 and to one terminal of a chopper frequency (the frequency of oscillator 2) bypass capacitor 66, which has a capacitance of the order of two thousand micro-microfarads. The second input signal terminal 67 is connected to the opposite terminal of capacitor 66 and to the "grounded" side of secondary 57 of transformer 48.

Transformer 64 is also a miniature ferrite core device having a pass band of the order of from ten to one-hundred kilocycles in order to pass the square wave supplied by current amplifier transistor 43. Secondary 68 of transformer 64 connects directly to a single-ended A.C. amplifier 5, which amplifier has previously been described.

The output from amplifier 5 passes directly to primary 70 of another miniature transformer 71. The secondary 69 thereof connects to elements of demodulator 6; i.e., one side directly to the collectors of transistors 72, 73.

Two more transistors 74 and 75 complete the voltage-doubler connection of the transistors of the demodulator. The collectors of transistors 74, 75 connect to capacitors 76, 77, respectively. These capacitors are connected together at the other terminals of each and this connection is connected to the other terminal of secondary 69 of transformer 71. By these connections the amplified modulated incoming signal is applied to the demodulator.

We now turn to the details of push-pull gate 7, as fully set forth in FIG. 2.

As has been mentioned, a push-pull output with respect to signal ground is available at the extremities of winding 32 of inductor 20 in the oscillator circuit. These extremities are fed through separate resistors 80, 81 to the separate bases of transistors 82, 83, respectively, of the push-pull gate 7. Through a conductive network of resistors between the negative voltage supply 40 and signal ground these transistors are heavily biased so that only the peaks of the sine waveshape from winding 33 are passed. A preferred duty cycle is 25%; i.e., the resulting pulses 12 and 13 of FIG. 3 have a duration only one-fourth that of the sine waveshape that was employed to form them.

The resistive network is comprised of resistors 86 and 89. The emitters of transistors 82 and 83 are connected to the junction between these resistors. The negative potential thus provided back-biases the transistors and not until this back-bias is overcome by the peaks of sine wave 10 do the transistors become operative to pass an output.

Resistor 86 has a resistance of ten thousand ohms and resistor 89 a resistance of two hundred ohms. Capacitor 90, of several microfarads capacitance, is connected in shunt to resistor 89 and so bypasses this bias supply.

Resistor 84, of several thousand ohms resistance, connects to negative voltage supply terminal 40 and in series with resistor 85, of one thousand ohms resistance, to the collector of transistor 82, to power the same. The above structure is repeated for transistor 83, in that resistor 87, of twice the resistance of resistor 84, is connected to terminal 40 and in series with resistor 87 is resistor 88, of one thousand ohms resistance, which connects to the collector of transistor 83.

Two further transistors 91 and 92 are connected in cascade with transistors 82 and 83, respectively, to give a desirably large current output for push-pull gate 7. The base of transistor 91 is connected to the junction of resistors 84 and 85 and the base of transistor 92 is connected to the junction of resistors 87 and 88. The collector of transistor 91 is connected to supply terminal 40 through resistor 93, having a resistance of the order of five hundred ohms. The collector of transistor 92 is similarly connected through resistor 94 of the same resistance as that of resistor 93. The emitter of transistor 91 is connected through resistor 95 of a few thousand ohms resistance to signal ground and the emitter of transistor 92 is similarly connected through resistor 96 of the same resistance as that of resistor 95.

Transformers 97 and 98 are employed to separately connect the outputs of transistors 91 and 92, respectively, to demodulator 6 for the gating thereof. These transformers are of the same small size as those previously described, but preferably have high quality iron cores. A step-down voltage ratio is preferred of about six to one in order to obtain a desirable amplitude of gating energy and a low impedance source for the same.

Primary 99 of transformer 97 is connected across resistor 95 and the primary 100 of transformer 98 is connected across resistor 96. Secondary 101 of transformer 97 is connected to both emitters of demodulator transistors 72 and 74 and to both of the bases of these transistors through resistors 102 and 103, respectively; each having a resistance of the order of two hundred ohms. Secondary 104 of transformer 98 similarly connects to transistors 73 and 75 of the opposite part of the demodulator, resistors 105 and 106 being connected to the respective bases of these transistors as before and having the same resistance value as resistors 102 and 103.

The connection of the demulator is according to that of a voltage-doubler rectifier. The algebraic addition of the square-wave modulated signal from transformer 71 and the two 180° offset-phase gating pulses from transformer 97 and 98, respectively, provide the demodulation of the square-wave signal according to the desired central one-fourth of each half wave alternation. When the peak-to-peak voltage of the signal from transformer 71 is, say, one volt, the peak output at the opposed extremity terminals of capacitors 76 and 77 is also one volt.

This output may be used in the rectified form, but it is usual and desirable to filter it to a corresponding direct current or to a relatively slowly varying alternating current, as the case may be according to the nature of the original input signal. This is accomplished by means of inductor 107 and capacitor 108. The values of these components depend upon the frequency employed for oscillator 2. Representative values are two henries for the inductor and 2,000 microfarads for the capacitor.

Resistor 109 is connected in shunt to capacitor 108 and terminates the filter comprised of elements 107 and 108. The resistance value of resistor 109 is of the order of fifty thousand ohms. Terminals 110 and 111 are the output terminals of the apparatus, at which an amplified duplicate of the signal impressed at input terminals 65 and 67 is obtained. Terminals 110 and 111 are represented as the single terminal 8 in FIG. 1.

Certain auxiliary elements in the embodiment of FIG. 2 comprise resistor 114, of two thousand ohms resistance, employed for voltage dropping and for isolation in connection with the collectors of transistors 24 and 35; also capacitors 115 and 116, having a capacitance of three microfarads each, and employed to prevent the flow of direct current in transformer primaries 99 and 100. Capacitor 31 coacts with resistor 114 in providing isolation.

Although specific examples of voltages and values for the several circuit elements have been given in this specification to illustrate the invention, it is to be understood that these are by way of example only and that reasonably wide departures can be taken therefrom without departing from the inventive concept. Other modifications of the circuit elements, details of circuit connections and alteration of the coactive relation between elements may also be taken under my invention.

Having thus fully described my invention and the manner in which it is to be practiced, I claim:

1. Apparatus for electrical amplification comprising
electrical means to form an alternating electrical wave having substantially symmetrical half cycle excursions as a function of time,
electrically symmetrical interrupter means connected to said electrical means and to a source of signal to be amplified,
means to amplify symmetrically connected to said interrupter means,
a synchronous demodulator,
said demodulator having an even number of transistors interconnected as a voltage doubler rectifier,
means to symmetrically connect said transistors to said means to amplify;
gating means connected to said electrical means to form separate oppositely-phased rectangular waveshapes from and during the maximum amplitude excursions of said alternating electrical wave,
and means to oppositely connect said gating means to the transistors of said demodulator with respect to the connections from said means to amplify to provide a demodulated output formed from only a part of the duration of each excursion of said alternating electrical wave.

2. The apparatus for electrical amplification of claim 1 in which said interrupter means comprises
a pair of input transformers,
a pair of transistors having corresponding input electrodes symmetrically connected to said input transformers,
and a single output transformer having corresponding output electrodes of said transistors symmetrically connected thereto.

3. The apparatus for electrical amplification of claim 1 in which said synchronous demodulator comprises
four transistors and two capacitors connected as a voltage double circuit to which said gating means and said means to amplify are oppositely connected.

4. The apparatus for electrical amplification of claim 1 in which said gating means comprises
means having two output channels connected to said electrical means to form separate alternating electrical waves of opposed polarity,
biased means connected to each of said output channels to pass only the maxima of said alternating electrical waves,
and separate circuit means connected to said biased means and to said synchronous demodulator to gate said synchronous demodulator by the passed said maxima.

5. Apparatus for electrical amplification comprising
oscillatory means having a frequency of oscillation greater than the frequency of alternation of a signal to be amplified,
means to form square waves, said oscillatory means connected to said means to form square waves to energize the same, a balanced transistorized chopper connected to said means to form square waves and to a source of signal to be amplified, an amplifier symmetrically connected to said balanced chopper, a demodulator having four transistors, each of said four transistors having collector, base and emitter electrodes, the collector electrodes of said transistors connected to said amplifier;

keying waveform means connected to said oscillatory means to operate synchronously therewith, said keying waveform means constituted for forming separate rectangular pulsed waves of opposite polarity each having pulses of duration less than the period of the oscillations of said oscillator means, and means to connect said keying waveform means in opposed relation to opposite base and emitter electrodes of said four transistors of said demodulator;

said chopper coactive with the incoming signal from said source to form a square waveform of electrical energy having an amplitude related to the amplitude of said signal and introducing transients adjacent to the alternations of said square waveform, and said demodulator coactive with the amplified said square waveform to provide a demodulated output formed from only that part of each excursion of said square waveform that is devoid of transients.

6. Apparatus for electrical amplification comprising a sine wave electrical oscillator, the period of oscillation of said oscillator being shorter than the period of an alternation of a signal to be amplified, a shaping amplifier connected to said oscillator and over-driven by the output thereof to form an electrical square wave, a two-transistor modulator connected to said shaping amplifier and to a source of signal to be amplified, an amplifier connected to said modulator, a voltage-doubler demodulator having four transistors, each of said transistors having a collector, an emitter and a base, the collectors of said transistors connected to said amplifier;

a keying waveform amplifier push-pull connected to said oscillator, said keying amplifier having push-pull connected transistors sufficiently biased to allow only the peaks of each excursion of said sine wave to be passed and having following cascade-connected transistors to form a rectangular pulse from each of said passed peaks, separate means to connect said cascade-connected transistors in push-pull relation to opposite bases and emitters of the four transistors of said demodulator, and output filter means connected to two of said collectors of the transistors of said demodulator;

said modulator constituted to act upon the incoming signal from said source to form a square waveform having an amplitude related to the amplitude of said signal;

said demodulator constituted to act upon the amplified said square waveform to provide a demodulated output including only the center portion of each excursion of said square waveform thereby to avoid spurious transients at the alternations of said square waveform.

7. In a chopper-modulated amplifying apparatus having an oscillator and an amplifier, the period of oscillation of said oscillator being shorter than the period of an alternation of a signal to be amplified, gated demodulator means comprising, gate means connected to said oscillator to form two separate series of pulses alternating in time from electrical oscillations of said oscillator with the duration of each pulse less than the duration of a said electrical oscillation, said pulses in one series having a polarity opposite to that of all said pulses in the other series, a demodulator, means to connect said gate means to said demodulator to separately impress said two series of pulses thereon, and further means to connect said amplifier to said demodulator symmetrically opposite to the connections from said gate means for gated demodulation of the output of said amplifier.

8. The amplifying apparatus of claim 7 in which said demodulator comprises four transistors each having an emitter and a base, said transistors connected as a voltage doubler with means to symmetrically connect said gate means between pairs of emitters and bases of said transistors, and other means to symmetrically connect said amplifier between the collectors of said transistors.

9. The amplifying apparatus of claim 7 in which said gate means comprises first means to provide a push-pull output from said oscillator, at least one transistor connected to each push-pull side of said first means, each said transistor biased to pass only the peaks of said push-pull output, and separate second and third means symmetrically connected between the push-pull sides of said gate means and said demodulator to symmetrically gate said demodulator.

10. In a chopper-modulated amplifying apparatus having an oscillator and an alternating current amplifier, gated demodulator means comprising, gate means having two separate opposed outputs, said gate means connected to said oscillator to form a first series of pulses from the electrical oscillations of said oscillator having one polarity with each pulse having a shorter duration than that of the oscillation from which it was formed, and to form a second series of pulses from said electrical oscillations having the opposite polarity with each pulse having a shorter duration than that of the oscillation from which it was formed, a synchronous demodulator, circuit means to connect one output of said gate means to said demodulator to impress said first series of pulses thereonto, further circuit means to connect the other output of said gate means to said demodulator to impress said second series of pulses thereonto, and still further circuit means to connect said alternating current amplifier to said demodulator oppositely with respect to the connections from said gate means for gated synchronous demodulation of the output of said alternating current amplifier.

11. In an amplifying apparatus for direct current amplification having an oscillator of the quasi-sinusoidal type, a modulator and an alternating current amplifier, gated demodulator means comprising a push-pull gate connected to said oscillator to form a first series of pulses from only the maxima of the electrical oscillations of said oscillator having one polarity and to form a second series of pulses from only opposite maxima of said electrical oscillations having a polarity opposite to said first-mentioned polarity, a voltage-doubler demodulator having four symmetrically connected transistors, said transistors each having input and output electrodes, plural circuit means to connection one side of the circuit of said push-pull gate to the input electrode of each of two of said four transistors to impress said first series of pulses thereonto, and to connect the other side of the circuit of said push-pull gate to the input electrodes of each of the remaining two of said four transistors to impress said second series of pulses thereonto, and further circuit means to connect said alternating current amplifier to the output electrodes of said four transistors for gated synchronous demodulation of the central part of the duration of each alternation of electrical output of said alternating current amplifier.

12. The amplifying apparatus for direct current amplification of claim 11 in which successive pulses of said first and said second series of pulses alternate between said first and said second series in equal increments of time and the duration of each said pulse is less than half of the duration of each said alternation.

References Cited in the file of this patent

UNITED STATES PATENTS

| | | |
|---|---|---|
| 2,611,084 | Gratian | Sept. 16, 1952 |
| 2,764,679 | Berkowitz | Sept. 25, 1956 |
| 3,008,090 | Millis et al. | Nov. 7, 1961 |

OTHER REFERENCES

Electronics, April 24, 1959, pages 94–95, "D.-C. Operational Amplifier With Transistor Chopper," by Hochwald Gerhard.